United States Patent [19]

Martin

[11] 4,007,361
[45] Feb. 8, 1977

[54] ADAPTIVE CONTROL SYSTEM USING POSITION FEEDBACK

[75] Inventor: Anthony Newman Martin, Simsbury, Conn.

[73] Assignee: United Technologies Corporation, Hartford, Conn.

[22] Filed: June 11, 1975

[21] Appl. No.: 586,010

[52] U.S. Cl. .............................. 235/150.1; 318/561
[51] Int. Cl.² ......................................... G05B 13/00
[58] Field of Search ................... 235/150.1, 151.11; 318/561, 619, 636

[56] References Cited
UNITED STATES PATENTS

| | | | |
|---|---|---|---|
| 3,250,898 | 5/1966 | Vasu | 318/561 X |
| 3,273,035 | 9/1966 | Inderhees | 318/619 X |
| 3,456,172 | 7/1969 | Hendrik et al. | 318/561 |
| 3,588,007 | 6/1971 | Naumann | 318/561 X |
| 3,611,100 | 10/1971 | McQuown, Jr. | 318/561 |
| 3,793,574 | 2/1974 | Hamel | 318/561 |
| 3,911,345 | 10/1975 | Totten | 235/150.1 X |
| 3,911,347 | 10/1975 | Hartung | 235/151.11 X |

Primary Examiner—Edward J. Wise
Attorney, Agent, or Firm—Donald F. Bradley

[57] ABSTRACT

A control computer produces a position error signal in accordance with the difference between the desired position of a controlled device and the actual position of the controlled device. The position error signal is amplified and compensated to produce a series of discrete control pulses of controlled but variable duration which regulate a servo actuating system connected to the controlled device so as to reposition the controlled device to the desired position. The servo actuating system is a simple on-off integrating valve which does not depend on feedback or other techniques to regulate the position of the controlled device in response to the control pulses from the control computer. Instead, the gain of the position error signal is varied during each cycle in an adaptive manner as a function of the measured change in position of the controlled device in response to the control pulse during the last previous cycle, and the next control pulse is accordingly generated as a function of the response of the entire control system during that previous cycle.

12 Claims, 3 Drawing Figures

FIG. 2

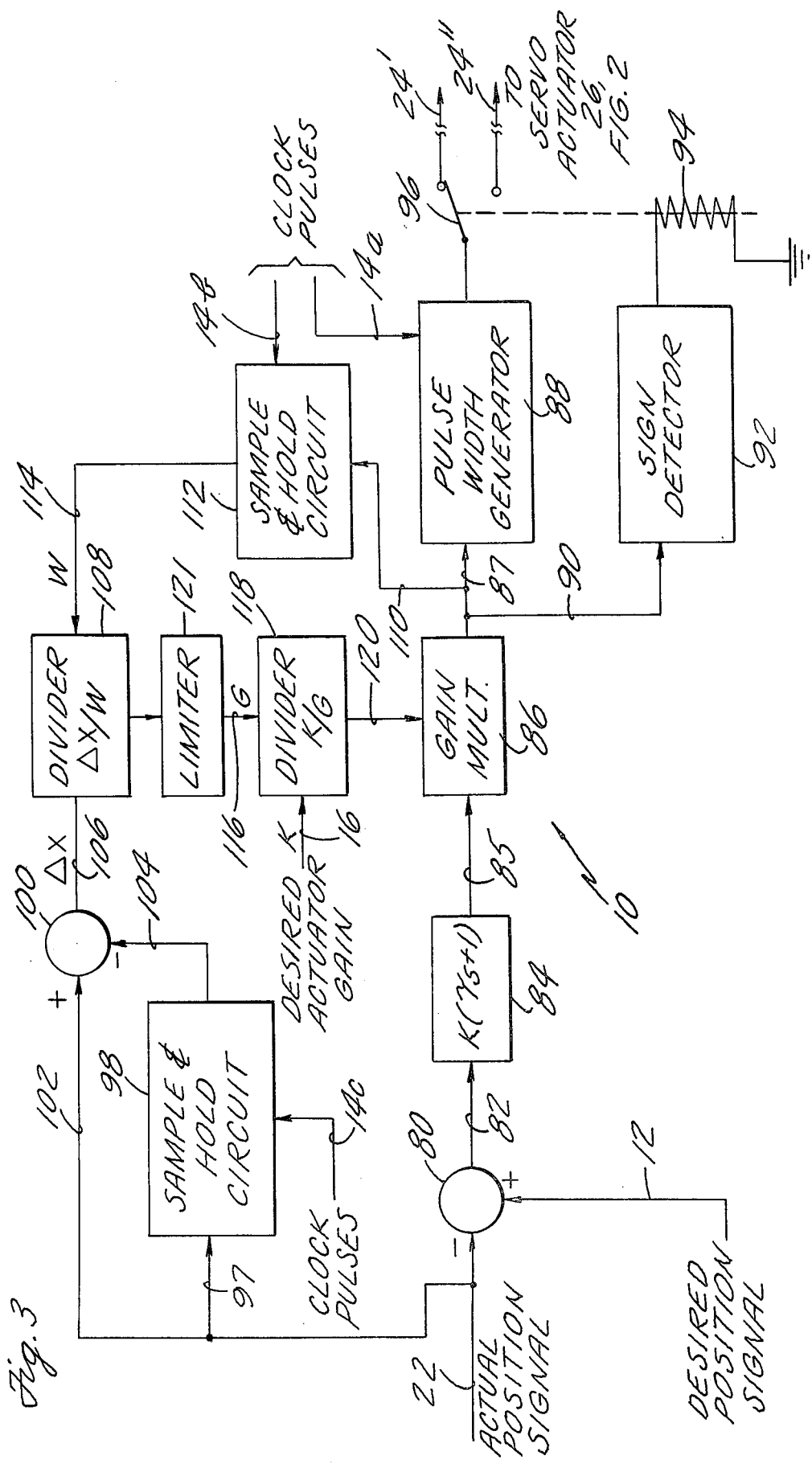

ADAPTIVE CONTROL SYSTEM USING POSITION FEEDBACK

BACKGROUND OF THE INVENTION

1. Field of the Invention

This invention relates to adaptive control systems, and particularly to a system in which the change in position of a controlled device in response to a discrete control pulse is measured, and the duration of the next occurring discrete control pulse is varied in response thereto. The invention has the advantage of reducing the cost and complexity of the servo actuating system for the controlled device.

2. Description of the Prior Art

Control systems such as servomechanisms for regulating the position of a controlled device in response to a control signal are well known in the art. In the aircraft industry, for example, it is desired to accurately control the position of the rudder, elevator, flaps and other components in response to pilot initiated or automatic control system inputs. Various components of turbine engines such as fuel control valves, exhaust nozzle actuators and variable geometry vanes are also positioned in response to control signals generated by control systems.

In the past it has been necessary, in order to assure that the controlled device is moved in a sufficiently fast yet stable manner to a desired position, to incorporate complex servo systems such as torque motors and hydromechanical servo amplifiers in the mechanical portion of the control system. These hydromechanical servos used internal feedback devices to provide fast yet stable operation and were constricted to close mechanical tolerances. Even with the advent of electronic control systems, similar expensive and complex mechanical systems were used to respond to the electronic control signals and to regulate the position of the movable mechanical element.

Although considerable progress has been made in lowering the cost and increasing the capabilities of electronic control systems by utilizing digital computation techniques and integrated circuit technology, this progress has been made by advancing the technology of the electronic control unit itself rather than the associated mechanical units which respond to the electronic signals and control the position of the movable controlled device. In all cases, the outputs from the electronic portion of the control systems are required to operate through mechanical or hydraulic systems in order to drive the controlled device. As control systems become more complex, more of the mechanical components are required, and in terms of cost, size and weight the mechanical portions of the system have become the most significant in the overall control system.

This situation is further aggravated by the fact that little advance has been made in servomechanical system technology to utilize the logic capabilities of the electronic controls, many of which contain digital computers therein. In fact, the servomechanical systems used in today's controls are essentially the same as those used with relatively unsophisticated analog electronic systems of many years ago. In many of today's electronic engine controls used on aircraft, the cost of the electronics is only one fourth of the total cost of the entire control system.

The present invention is directed to a novel adaptive control system which makes full use of the capabilities of an electronic control computer to reduce the cost, complexity and accuracy requirements of the servomechanical portion of the system, resulting in a low cost yet rapid acting control system having infinite resolution, and which operates from a discrete switched input control signal to the servomechanical portion of the system. As a consequence, the tolerances and restraints on the cost and design of the servomechanical portion of the system are considerably reduced since no complex or expensive feedback is required in the servomechanical system to assure that the controlled device, a movable mechanical element subjected to wide load variations, is properly positioned in response to the electronic control signal. By reducing the cost and weight of the servomechanical portion of the system at the expense of a slight increase in complexity of the electronic portion of the system, the total cost and complexity of the entire control system is considerably reduced.

SUMMARY OF THE INVENTION

An object of the present invention is to provide a novel adaptive control system for a controlled device in which the duration of a discrete control pulse for the controlled device is varied as a function of the response of the controlled device to the last previous control pulse.

A further object of the present invention is an adaptive control system for a controlled device in which a simple, inexpensive servomechanical system for physically positioning the controlled device in response to an electronic control signal may be utilized.

In accordance with the present invention a position error signal is generated in response to the difference between a commanded or desired position of a movable mechanical element such as an exhaust nozzle in a turbine engine, and the actual position of the movable mechanical element as measured by a position sensor. The resultant position error signal is amplified and compensated, and a discrete control signal is produced from the error signal in the form of a pulse having a duration proportional to the product of the compensated error signal and the control loop gain. The control signal is fed to a servo actuator or other servomechanical system which in turn moves the mechanical element in the desired direction. The position sensor measures the change in position of the movable mechanical element in response to the control signal. Since the change in position of the movable mechanical element is determined not only by the duration of the control signal but also by the efficiency of the servomechanical system, the load on the movable mechanical element and other factors in the control system, the change in the position of the movable mechanical element is used in an adaptive manner to regulate the gain applied to the error signal and the duration of the next discrete control signal.

In accordance with the present invention, a control computer measures the true gain of the system as a function of the change in position of the movable mechanical element in response to the duration of the control signal. The true gain of the system is compared with a nominal gain initially assigned to the system. Any difference between the true gain and the nominal gain produces a gain correction signal which is used in turn to modify the duration of the control signal. By modifying the gain of the system and hence the duration of the control signal at discrete intervals, variations in the servomechanical portion of the control system and the load reactions are automatically compensated without the necessity of a complex servomechanical system.

While the function of the control computer is described with reference to an illustrative analog embodiment, the adaptive portion of the present invention may likewise be performed in a digital signal embodiment.

BRIEF DESCRIPTION OF THE DRAWINGS

FIG. 3 is a schematic representation of the control computer of FIG. 1.

DESCRIPTION OF THE PREFERRED EMBODIMENT

Figure 1:
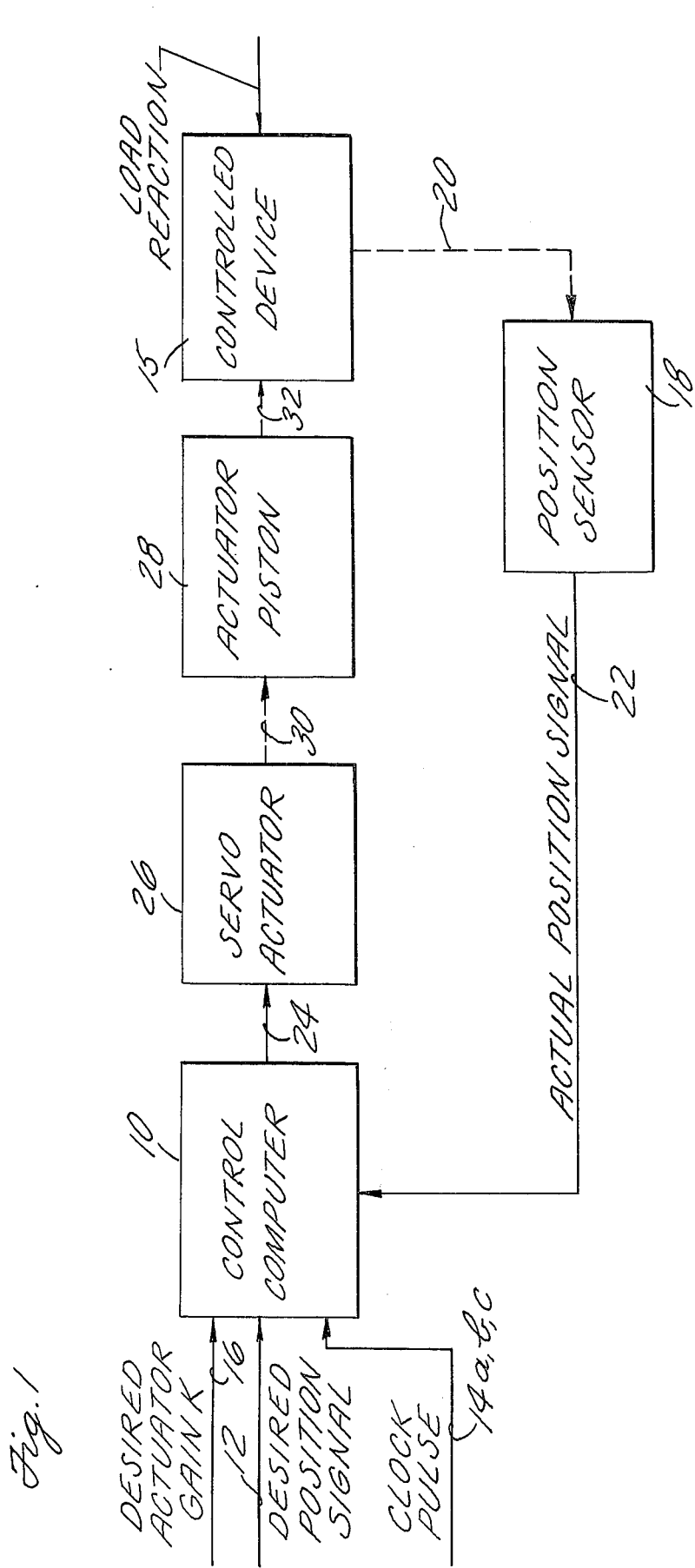
FIG. 1 is a schematic representation in block diagram form of the control system of the present invention.

Referring particularly to FIG. 1, there is shown the control system of the present invention. The heart of the control system is a control computer 10 to which there is fed via line 12 a signal indicative of the desired output position of a controlled device 15. The desired position signal on line 12 may be produced in response to control logic, not shown, such as a fuel control or an autopilot, and may, for example, be indicative of the desired position of a fuel valve. The control computer 10 may be a digital computer, or alternatively may be an analog computation unit. Clock pulses from a source, not shown, are fed to the control computer 10 via signal lines 14a, b, c. As will be explained subsequently, a signal indicative of the nominal or desired actuator gain is also fed to the control computer 10 via signal line 16. If a digital computer is utilized, the desired actuator gain signal may be stored in the computer.

The actual position of the controlled device 15 is sensed by a position sensor 18 such as a potentiometer via a mechanical linkage shown schematically as line 20. The output from the position sensor 18, a signal indicative of the actual position of the controlled device 15, is also fed as an input to the control computer 10 via signal line 22. The control computer produces an error signal indicative of the difference between the desired and actual positions of the controlled device. As will be explained, a gain initially fixed by the desired actuator gain K on signal line 16 is applied to the position error signal in the control computer 10, and the control computer produces a control signal in the form of a discrete pulse which has a duration equivalent to the product of the position error signal and the gain. The control signal pulse is fed via line 24 to a servo actuator 26 which in turn moves an actuator piston 28 via mechanical linkage 30, the actuator piston 28 moving the controlled device 15 as shown by mechanical connection 32. The direction of movement of the controlled device 15 is determined by the sign of the error signal which in turn controls the direction of movement of the actuator piston 28.

As will be described in detail, the position error signal produced in the control computer is used together with adaptive type logic contained in the computer to generate the discrete command or control signal for the servo actuator. The servo actuator controls the flow of hydraulic fluid to the actuator piston 28 so as to move the piston and null the computed position error signal. The electronic control components of the system of FIG. 1 may be remotely mounted, or integrated with the other portions of the control system.

Figure 2:
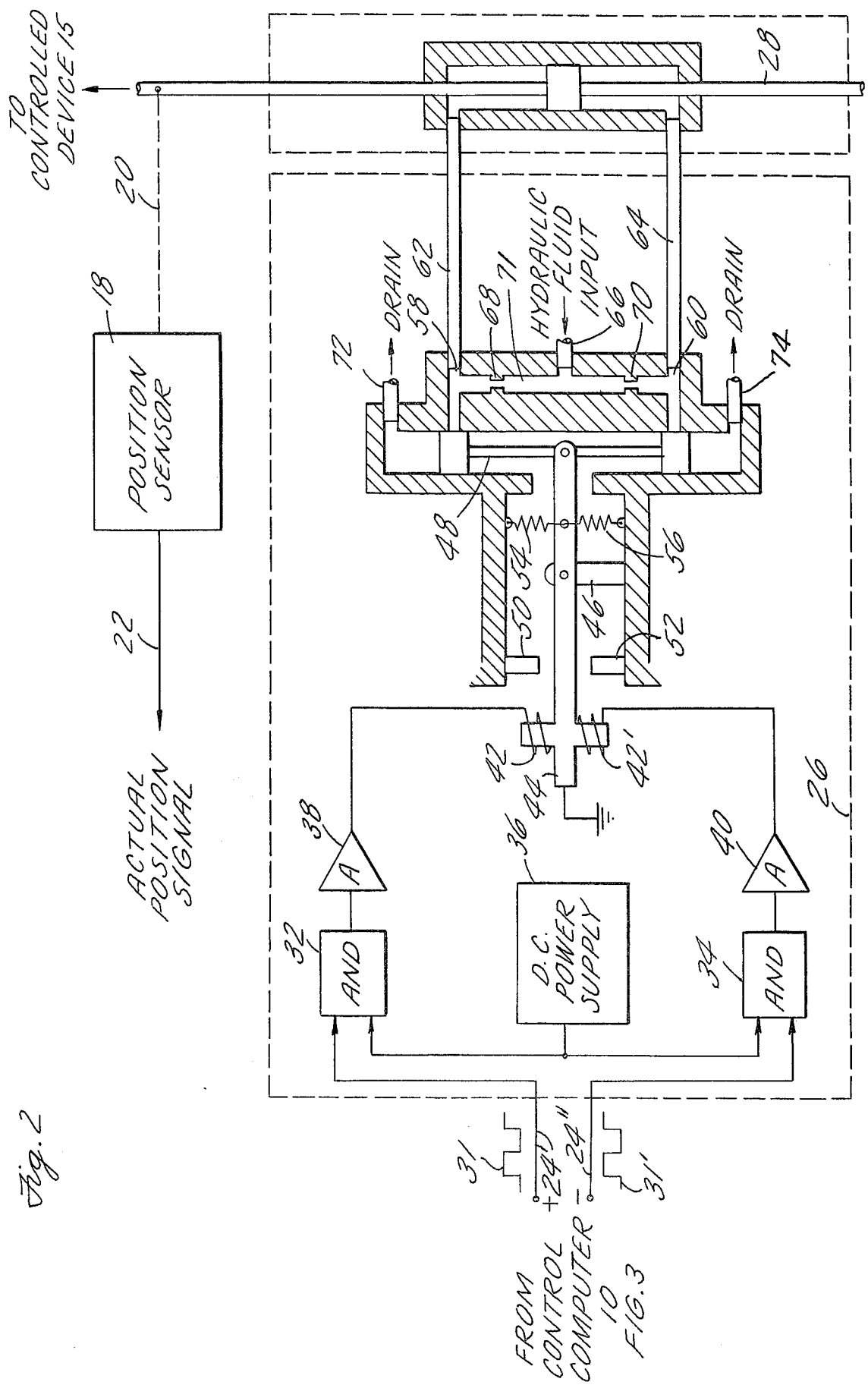
FIG. 2 is a schematic representation of the servo actuator and position feedback portion of the control system of FIG. 1.

A representative servo system is shown in detail in FIG. 2. As will be described subsequently, the control computer 10 produces control signal inputs to the servo actuator 26 shown in FIG. 2 as discrete control pulses 31 and 31' which appear respectively on lines 24' and 24'' and which are fed to respective AND gates 32 and 34. DC electrical power is provided from supply 36 to the AND gates 32 and 34. Since only one of the pulses 31 and 31' will be generated during each clock cycle, only one of the AND gates 32 or 34 will be actuated and will pass therethrough the pulse appearing on one of the signal lines 24' or 24''. Assuming that the control computer 10 is calling for an increase in the position of the controlled device 15, AND gate 32 will be actuated and the pulse appearing on line 24' will be passed therethrough to an amplifier 38. A similar amplifier 40 is connected to AND gate 34. The output from the amplifier 38 actuates a solenoid 42 which causes displacement of a beam 44 in the appropriate direction. Similarly, an output from amplifier 40 will actuate solenoid 42' and will cause displacement of beam 44 in the opposite direction.

Beam 44 is mounted for rotation about fulcrum 46 and in turn translates a spool valve 48 connected to the opposite end of the beam 44. Mechanical stops 50 and 52 are positioned as shown to restrict the movement of beam 44, and springs 54 and 56 are used to return the beam 44 to an approximately central position between the stops 50 and 52 when neither of the solenoids 42 or 42' is energized.

In the central position the spool valve 48 blocks two ports, 58 and 60, which are connected by hydraulic lines 62 and 64 to each side of the actuator piston 28. A high pressure hydraulic supply line 66 is connected to both hydraulic lines 62 and 64 via restricting nozzles 68 and 70 in passage 71. When one of the solenoids 42 or 42' is energized, spool valve 48 is translated by movement of beam 44 and the appropriate port 58 or 60 is opened, permitting escape of the fluid to one of the drains 72 or 74, with a consequent pressure reduction on the side of the actuator piston 28 which is opened to the drain. The hydraulic unbalance across the piston 28 will cause the piston to move in a direction determined by the pressure across the piston and at a rate which is a function of the pressure differential, the load on the piston, the friction in the actuator 26 and the inertia of the mechanical moving parts. The actuator piston 28 is connected to the controlled device 15 and moves the controlled device in response to movement thereof. It should be noted that there is no attempt to control the movement of the actuator piston 28 or of the controlled device 15 by internal feedback devices, tolerance control, or any other means. Even leakage through the spool valve 48 to drain when the spool valve is in its center position is not critical. The system as shown enables the servo actuator and actuator piston to be manufactured by low cost techniques. The servo system acts as a basic on-off integrating valve. Other servo systems may be used in place of the system described in FIG. 2 due to the flexibility of the control system and the adaptive nature of the control loop logic contained within the control computer described in conjunction with FIG. 3.

Movement of the actuator piston 28 is sensed by position sensor 18 connected thereto via mechanical connection 20, and a position feedback signal is fed from the position sensor 18 via signal line 22 to the control computer 10. It should be noted that the position sensor 18 need not be connected to the actuator piston, but may in fact be connected directly to the controlled device 15 as shown schematically in FIG. 1, as long as the output from the position sensor is a function of the position of the controlled device 15.

The actual position signal on signal line 22 is summed with the desired position signal on signal line 12 in a summing junction 80 as shown in FIG. 3. The resultant position error signal on line 82 is multiplied by a gain K and a stabilizing lead dynamic compensation function $(\tau_s + 1)$ in block 84. The values of K and $\tau$ are selected for each individual actuator loop according to the performance requirements and load characteristics. For purposes of description it is assumed that the gain K in block 84 is identical to the desired actuator gain K appearing on signal line 16.

The compensated error signal is fed via signal line 85 from block 84 to a gain multiplier 86, the function of which will be described subsequently, and, after gain multiplication in block 86, the error signal is fed via line 87 to a pulse width generator 88 which may consist of a transistor switch producing as an output therefrom a discrete voltage for a time period defined by the magnitude of the error signal on line 87. Clock pulses are fed to the pulse width generator 88 via line 14a so that the output of the pulse width generator 88 is updated at each clock pulse. Consequently, an error command of, for example, 100 percent from gain multiplier 86 would result in continuous operation of the pulse width generator 88, and an error command of 50 percent from gain multiplier 86 would result in a pulse from pulse width generator 88 for 50 percent of the duty cycle. A typical duty cycle for the clock pulses would be about 20 msec.

The output from the gain multiplier 86 is also fed via line 90 to a sign detector circuit 92 which determines the sign of the error signal and accordingly actuates a relay 94 which in turn moves switch 96 to contact one of the output lines 24' or 24". The control signal output from the pulse width generator 88 fed through switch 96 to one of the output lines 24' or 24" will result in movement of the actuator piston 28 (FIG. 2) during each pulse cycle.

Gain multiplier 86 provides a gain to the error signal as a function of the change in position of the controlled device as measured by the position sensor 18 during the previous clock cycle. The gain in multiplier 86 is derived from signal line 120 and is updated each cycle. To provide the updating capability, the actual position signal on line 22 is fed via line 97 to a sample and hold circuit 98 to which is also fed a series of clock pulses via line 14c. The actual position signal on line 22 is also fed to a summing junction 100 via line 102. The sample and hold circuit 98 stores therein the actual position signal at the last preceding clock pulse. Upon receipt of the next clock pulse, the new position data is fed as an input to the sample and hold circuit and the last preceding position data is fed to the summing junction 100 via line 104. The sample and hold circuit 98 may contain a shifting register. At each clock pulse the summing junction 100 thereby receives on line 102 a signal indicative of the present position of the controlled device, and via line 104 a signal indicative of the position of the controlled device at the last preceding clock pulse. The output from the summing junction 100 is consequently a signal indicative of the change in position of the controlled device between clock pulses. This signal, indicated as $\Delta x$, is fed via line 106 to a divider 108.

The output from the gain multiplier 86 on line 87 is fed via line 110 to a sample and hold circuit 112, the sample and hold circuit being similar to sample and hold circuit 98. Clock pulses are also fed to sample and hold circuit 112 via line 14b. The sample and hold circuit 112 stores therein the output from the gain multiplier 86 which occurred at the last preceding clock pulse. The output from gain multiplier 86 is a signal having an amplitude proportional to the duration of the control pulse produced in pulse width generator 88. Upon the next clock pulse on line 14b, sample and hold circuit 112 feeds to divider 108 via line 114 the signal indicative of the last preceding output from gain multiplier 86 and shown as W.

Divider 108 divides the position change of the controlled device during the last preceding cycle, $\Delta x$, by the commanded pulse length signal, W, and produces a signal G which appears on line 116 and is indicative of the actual gain of the servo actuator system. Negative values of this gain, such as may occur during a transient overshoot of the controlled device, are prevented by limiter 121 which signals a zero when such negative values exist. The actual gain signal on line 116 is fed to a divider 118, to which is also fed the desired or nominal actuator gain K which appears on line 16. Divider 118 divides the actual system gain on line 116 by the nominal or desired actuator gain K on line 16 and produces therefrom on line 120 a gain correction term which is in turn fed to gain multiplier 86. The gain correction term is then used during the next duty cycle to adjust the gain of the error signal in gain multiplier 86 and thereupon regulate the width of the next discrete output pulse from pulse width generator 88 to adapt the system to the variables of operation of the servo actuator system which affect the movement of the actuator piston 28 and the change in position of the controlled device 15. Consequently, changes due to variations in actuator piston load, friction, hydraulic servo supply pressure, etc., are compensated resulting in an actuator response rate which is consistent and conforms with the closed loop design requirements. These requirements result in a desired cycle time being established to optimize the loop performance with the various possible actuator load characteristics. If the actual gain G is equal to the desired actuator gain K, no correction is applied to gain multiplier 86. It should be noted that the output signal from gain multiplier 86 is implicitly limited to a 100 percent duty cycle of the pulse width generator 88.

Although shown in FIG. 3 in analog format, it should be noted that the control computer 10 may assume the form of an appropriately programmed digital computer. It is also apparent that other changes may be made in the construction and arrangement of the various components of the present invention without departing from its scope as hereinafter claimed.

I claim:

1. An adaptive control system for positioning a controlled device in response to desired position signals and desired gain signals provided by a signal source, comprising
- means for producing a signal indicative of the actual position of said controlled device,
- means for summing said actual position signal with said desired position signal and producing a position error signal proportional to the difference therebetween,
- multiplier means for applying a gain to said error signal to produce therefrom a control signal,
- servo means responsive to said control signal for varying the position of said controlled device,
- means responsive to the change in position of said controlled device produced by said control signal for generating an actual gain signal,
- and means for varying the gain of said multiplier means as a function of said actual gain signal.

2. An adaptive control system as in claim 1 and including means for generating a series of clock pulses,
- and means for varying the gain of said multiplier means only upon the occurrence of each of said clock pulses.

3. An adaptive control system as in claim 1 and including pulse width generator means connected with said servo means for producing a discrete output signal having a duration proportional to the amplitude of said control signal,
- said servo means including actuator means responsive to the duration of said discrete output signal for varying the position of said controlled device.

4. An adaptive control system as in claim 3 and including switch means connecting said pulse width generator means with said actuator means, said switch means having a first position for causing said actuator means to vary the position of said controlled device in a first direction, and a second position for causing said actuator means to vary the position of said controlled device in direction opposite that of said first direction,
- and means responsive to the polarity of said control signal for moving said switch means to one of said first or second positions.

5. An adaptive control system as in claim 1 in which said means for generating an actual gain signal comprises
- a first storage means for storing therein a signal indicative of the previous position of said controlled device,
- a second storage means for storing therein the last occurring control signal,
- means for summing the signal in said first storage means indicative of the previous position of said controlled device with said actual position signal generated in response to said last occurring control signal to produce a position change signal,
- and first divider means for dividing the position change signal by said last occurring control signal stored in said second storage means to provide the actual gain signal.

6. An adaptive control system as in claim 5 and including limiter means for preventing negative values of said actual gain signal.

7. An adaptive control system as in claim 5 in which said means for varying the gain of said multiplier means as a function of said actual gain signal comprises
- second divider means for dividing the desired gain signal by said actual gain signal to produce a gain correction signal,
- and means for adjusting the gain of said multiplier means in response to said gain correction signal.

8. A method for adaptively controlling the position of a controlled device in response to the presence of desired gain signals and desired position signals, comprising the steps of
- generating a signal indicative of the actual position of said controlled device,
- summing said desired position signal with said actual position signal to produce therefrom a position error signal,
- applying a gain to said position error signal to produce therefrom a control signal,
- moving said controlled device in response to said control signal,
- determining the change in position of said controlled device produced by said control signal and generating an actual gain signal as a function thereof,
- and varying the gain applied to said position error signal as a function of said actual gain signal.

9. The method of claim 8 and including the steps of
- producing in response to said control signal a discrete pulse signal having a duration proportional to said control signal,
- and moving said controlled device for a time determined by the duration of said discrete pulse signal.

10. The method of claim 8 and including the steps of
- sensing the polarity of said control signal,
- and moving said controlled device in a direction determined by the polarity of said control signal.

11. The method of claim 8 in which the step of generating an actual gain signal includes the steps of
- storing said previous control signal,
- storing a signal indicative of the previous position of said controlled device,
- producing a signal indicative of the present position of said controlled device after movement thereof in response to said control signal,
- summing said previous position signal with said present position signal to produce a position change signal,
- and dividing said position change signal by said stored previous control signal.

12. The method of claim 11 and further including the steps of
- dividing the desired gain signal by said actual gain signal to produce a gain correction signal,
- and varying the gain applied to said position error signal in response to said gain correction signal.

* * * * *